United States Patent [19]
Kumano et al.

[11] Patent Number: 5,630,657
[45] Date of Patent: May 20, 1997

[54] CRAWLER

[75] Inventors: Yoichi Kumano, Miura-gun; Takeo Muramatsu, Yokohama, both of Japan

[73] Assignee: Bridgestone Corporation, Tokyo, Japan

[21] Appl. No.: 341,985

[22] Filed: Nov. 16, 1994

[30] Foreign Application Priority Data

| Nov. 20, 1993 | [JP] | Japan | 5-314423 |
| Nov. 20, 1993 | [JP] | Japan | 5-314424 |
| Dec. 5, 1993 | [JP] | Japan | 5-339676 |
| Sep. 21, 1994 | [JP] | Japan | 6-265994 |
| Sep. 21, 1994 | [JP] | Japan | 6-265995 |
| Sep. 21, 1994 | [JP] | Japan | 6-265996 |
| Oct. 12, 1994 | [JP] | Japan | 6-274513 |

[51] Int. Cl.$^6$ ............................................. B62D 55/26
[52] U.S. Cl. ........................ 305/46; 305/189; 305/192
[58] Field of Search ................................ 305/39, 46, 51, 305/54, 35 R, 58 R, 58 PC, 101, 114, 185, 187, 189, 191, 192

[56] References Cited

U.S. PATENT DOCUMENTS

| 2,404,488 | 7/1946 | Hait | 305/35 R X |
| 2,869,932 | 1/1959 | Eichweber | 305/35 R X |
| 3,504,951 | 4/1970 | Hirych | 305/58 X |
| 3,973,807 | 8/1976 | Korner et al. | 305/35 R X |
| 4,443,041 | 4/1984 | Wohlford | |
| 4,522,452 | 6/1985 | Wohlford | |
| 5,388,900 | 2/1995 | Suzuki | 305/51 X |

FOREIGN PATENT DOCUMENTS

| 0300488B1 | 1/1989 | European Pat. Off. | |
| 58-133971 | 8/1983 | Japan | |
| Y2 62-34864 | 5/1984 | Japan | |
| 59-137265 | 8/1984 | Japan | |
| 1404402 | 6/1988 | U.S.S.R. | 305/54 |

*Primary Examiner*—Russell D. Stormer
*Attorney, Agent, or Firm*—Oliff & Berridge

[57] ABSTRACT

A crawler block rubber pad for a crawler which has an endless path of movement and which is used for a vehicle. Links are axially supported and connected by pins in an endless shape, and crawler blocks are attached to outer surfaces of the links. In the crawler block rubber pad, a rubber pad is formed integrally, by vulcanization and adhesion, to an outer side surface of a crawler block and to end portions of the crawler block as seen from a longitudinal direction of the links. Preferably, the rubber pad is vulcanized and adhered to both end portions of the crawler block in the longitudinal direction of the links. Even if a small stone or the like becomes caught in a space between crawler blocks which space widens when the crawler is trained around an idler or the like, because a thickness of rubber material is provided so as to be larger than a radius of a small stone, no unwanted force is applied to the pins and the links.

12 Claims, 24 Drawing Sheets

CRAWLER

BACKGROUND OF THE INVENTION

1. Field of the Invention

The present invention relates to a crawler which has an endless path of movement and which is used for a vehicle such as a machine used for construction, a machine used for civil engineering or the like. In particular, the present invention relates to a rubber pad of a crawler block.

2. Description of the Related Art

When machines for construction or machines for civil engineering work travel on paved roads, the paved surface may be damaged. As a result, crawler blocks having rubber pads on the outer surfaces thereof have come into use in place of steel crawler blocks.

FIG. 36 is a side view of a conventional crawler using crawler blocks having rubber pads. FIG. 37 is a side view of the crawler trained around a sprocket or an idler.

In the drawings, $1_0$ is a link, $2_0$ is a crawler block, and $3_0$ is a rubber pad vulcanized and adhered to the outer surface of the crawler block $2_0$. The links $1_0$ and the crawler block $2_0$ are fixed by bolts $4_0$ and nuts $5_0$. Adjacent links $1_0$, $1_0$ are axially supported by pins $6_0$. The crawler is trained around unillustrated track rollers or sprockets or around idlers $7_0$ which contact the upper surfaces of the links $1_0$ so that the crawler rotates and travels.

Further, when the crawler is trained around a sprocket or the idler $7_0$, as illustrated in FIG. 36, the line connecting the pins $6_0$, $6_0$ of the crawler becomes a neutral line. The crawler rotates with the portions thereof at the inner side of this line narrowing, while the portions thereof at the outer peripheral side of the line widen.

When the crawler is trained around the idler $7_0$ or the like, the spaces ($W_0$) between outer peripheral sides of adjacent crawler blocks $2_0$, $2_0$ become very large. Therefore, small stones, pieces of ore or the like may become caught in the spaces such that damage to the crawler blocks $2_0$ and the rubber pads $3_0$ is unavoidable.

Further, crawler rubber shoes in which rubber is vulcanized and adhered to the ground-contacting surface thereof have by preference come into use. FIG. 38 is a ground-contacting surface side plan view illustrating an example of a crawler rubber shoe. FIG. 39 is a side view thereof, and FIG. 40 is a cross sectional view taken along line N—N of FIG. 38.

In the conventional crawler rubber shoe, a metal crawler block 54 is attached by bolts 52 and nuts 53 to connection links 51 which form the crawler. Usually a grouser 55 is formed at the ground-contacting surface side of the metal crawler block 54, i.e., at the outer surface side of the crawler block 54. A rubber pad 56 is vulcanized and adhered so that the grouser 55 is covered.

In the conventional crawler block rubber shoe described above, the rubber pad 56 is vulcanized and adhered to the outer side surface of the metal crawler block 54, and the top surface of the rubber pad 56 is a substantially flat surface.

Depending on the case, the rubber pad 56 may be formed such that, as illustrated in FIG. 41, the center of the top surface thereof is flat, whereas the end portions thereof are formed to have smaller thicknesses.

As a result, when a crawler using this crawler block rubber shoe is used as the traveling device of a machine, peeling of the rubber pad 56 from the metal crawler block 54 occurs easily. Further, the surface pressure on the central portion of the rubber pad 56, which supports the weight of the machine body, becomes much larger than the surface pressure on the end portions. As a result, defects in the rubber concentrate at the central portion where the surface pressure is high.

Moreover, because the grouser 55 is formed at the outer surface side of the crawler block 54 in the longitudinal direction thereof, the thickness of the rubber with respect to the ground-contacting surface of the rubber pad 56 varies. As a result, the compressive strain on the rubber pad 56 varies at the respective portions thereof. The durability of the rubber therefore markedly deteriorates.

When the crawler travels over small stones or the like, the crawler bends toward the inner side, i.e., so-called "reverse bending" occurs at the ground-contacting regions of the crawler. In this case, the end portions of adjacent crawler blocks contact each other so that the reverse bending is stopped. However, usually, there is a large space between the crawler blocks, and even if reverse bending occurs, it is difficult for the end portions to contact each other. Accordingly, it is difficult to prevent reverse bending.

The conventional crawler rubber pad covers the outer surface side of the crawler block and is vulcanized and adhered thereto. During manufacturing, the crawler block is set in a mold, and the remaining space in the mold is filled with rubber. The rubber which has been made fluid moves easily around not only the ground-contacting surface of the crawler block, but also to the inner side thereof. Track links are to be fixed to this crawler block, but because the inner surface of the crawler block and the inner surface of the rubber pad are in the same plane, the protruding of rubber at the inner surface side of the crawler block is quite incommodious, and the entire protruding rubber portion must be removed when the track links are to be attached.

Namely, the protruding rubber which has circled around to the inner side of the crawler block is removed by a knife or by buff finishing. Such processes not only require labor, but also, the main rubber pad body is easily damaged in such processes. Accordingly, there is a need for improvement.

SUMMARY OF THE INVENTION

The present invention aims to solve the drawbacks of the conventional art, and provides a structure in which no unwanted force is applied to the pins and the links even in a case in which small stones or the like get caught in the widened space between crawler blocks when the crawler is trained around a sprocket or an idler.

Another object of the present invention is to prevent peeling of the crawler block rubber pad and to substantially uniformize the surface pressure applied to the rubber pad, so that defects in the rubber pad can be reduced.

Other objects of the present invention are to optimize in practice a crawler using crawler block rubber pads, prevent reverse bending, prevent small stones or the like from becoming caught between adjacent crawler blocks, and improve the life span of the crawler.

Still another object of the present invention is to provide a crawler rubber pad in which track links can be mounted without eliminating the protrusion of rubber at the inner side portions of the crawler block to which the links are attached.

In the present application, the "inner side" of the crawler block or the rubber pad refers to the side of the crawler block or the rubber pad toward the sprocket or idler. The "outer side" of the crawler block or the rubber pad refers to the side of the crawler block or the rubber pad at the side opposite the sprocket or idler side.

A first aspect of the present invention is a crawler comprising: connecting members; links connected by said connecting members in an endless shape; crawler blocks attached to outer side surfaces of said links; and rubber pads formed integrally, by vulcanization and adhesion, with outer side surfaces of said crawler blocks and with end portions of said crawler blocks, as seen from a longitudinal direction of said links.

In a second aspect of the present invention, in the crawler of the first aspect, the outer side surfaces of said crawler blocks are flat.

In a third aspect of the present invention, in the crawler of the first aspect, said rubber pads comprise rubber materials which are vulcanized and adhered to both end portions of said crawler blocks as seen from the longitudinal direction of said links.

In a fourth aspect of the present invention, in the crawler of the third aspect, for each of said rubber pads, the total of the distances from each end portion of said rubber pad to the end portion of said crawler block which is nearest to said end portion of said rubber pad is a distance which fills a space between adjacent rubber pads which widens when said crawler is trained around one of a sprocket or an idler.

Even if a small stone or the like becomes caught in the space between the crawler blocks which space widens when the crawler is trained around a sprocket or an idler, due to the compressive deformation of the rubber material at these portions, unwanted force is not applied to the pins and the links.

It is optimal that the rubber pad, which is integral with the crawler block, is vulcanized and adhered. In particular, the rubber material is formed integral with the pad material at the end portions of the crawler block oriented in the longitudinal direction of the crawler. The rubber material can be formed at one of these end portions of the crawler block. However, it is good to form the rubber material at both ends. In particular, it is preferable from the standpoint of the durability of the rubber that the rubber material is provided substantially uniformly at both ends.

The thickness, in the longitudinal direction of the crawler, of the rubber material formed at the end portions of the crawler block fills the space which opens when the crawler is trained around a sprocket or an idler. Further, in cases in which the rubber material not only is thick, but also, the thickness is greater than the space between adjacent crawler blocks when the crawler is disposed in the horizontal direction, unwanted force is not applied to the pins connecting the links.

However, because the rubber materials are elastic, a permissible range for the thickness of the rubber material in the longitudinal direction of the crawler is about 5 to 10 mm greater than the space between adjacent crawler blocks, depending of course on the type of crawler.

The durability of the pad crawler (a crawler in which pads are adhered to metal crawler blocks) is related to the thickness of the rubber pad. When a flat crawler block is used, the pad thickness is uniform, local abrasion and breaking are prevented, and durability improves.

In the present invention, even if small stones or the like become caught in the spaces between the crawler blocks which spaces become wider when the crawler is trained around a sprocket or an idler, because the rubber materials at these portions compressively deform, unwanted force is not applied to the pins and the links. Accordingly, the durability of the crawler is improved.

More concretely, the crawler block 2 may have the same dimension to the transverse ends thereof, as illustrated in FIGS. 1 and 2A. However, in the example of FIGS. 1 and 2A, the transverse end portions of the crawler block 2 are formed so as to have somewhat smaller widths. The rubber materials $3_1$, $3_2$, $3_3$, $3_4$ are formed at the respective peripheral ends of the crawler block 2, and in the example, extend to the reverse surface side of the crawler block 2. Forming the rubber material $3_5$ at the reverse surface side of the crawler block 2, i.e., at the link 1 side of the crawler block 2, prevents peeling of the rubber pad 3 from the crawler block 2.

A fifth aspect of the present invention is a crawler comprising: connecting members; links connected by said connecting members in an endless shape; crawler blocks attached to outer side surfaces of said links; and rubber pads vulcanized and adhered on outer side surfaces of said crawler blocks to inner side end surfaces thereof, and for each of said rubber pads, a thickness ($h_2$) of a portion of said rubber pad along each longitudinal direction end of said crawler block, which portion is from a plane contacting said crawler block to an outer side surface of said rubber pad, is greater than a thickness ($h_1$) of a central portion of said rubber pad, which central portion is from a surface contacting said crawler block to the outer side surface of said rubber pad.

In a sixth aspect of the present invention, in the crawler of the fifth aspect, thicknesses of portions of four peripheral portions of said rubber pad, as seen from a direction orthogonal to the outer side surface of said crawler block, which portions are from the plane contacting said crawler block to the outer side surface of said rubber pad, are respectively greater than $h_1$.

In a seventh aspect of the present invention, in the crawler of the sixth aspect, the thicknesses of the portions of four peripheral portions of said rubber pad, as seen from a direction of thickness of said crawler block, which portions are from the surface contacting said crawler block to the outer side surface of said rubber pad, are respectively substantially 1 to 10 mm larger than $h_1$.

In an eighth aspect of the present invention, in the crawler of the fifth aspect, $h_1$ is greater than or equal to 20 mm.

In a ninth aspect of the present invention, in the crawler of the eighth aspect, $h_2$ is greater than or equal to 10×(weight of machine body in tons)$^{0.5}$ mm.

In a tenth aspect of the present invention, in the crawler of the eighth aspect, $h_2$ is greater than or equal to 20 mm and is greater than or equal to 10×(weight of machine body in tons)$^{0.5}$ mm.

In the present invention, because the rubber pad extends to the inner side end portion of the crawler block, peeling of the rubber pad from the crawler block can be prevented. The surface configuration of the rubber pad formed at the ground-contacting surface of the crawler block is a specific configuration. Namely, the end portions of the rubber pad are formed so as to be more thick than the central portion. Due to the central portion of the rubber pad being recessed further than the peripheral portions, the thicknesses are set so as to allow for the ground-contacting surface of the rubber pad to be horizontal in a case in which the load of the machine body is applied to the rubber pad. In this way, the concentration of the load of the machine body on the rubber pad is dispersed. Defects in the rubber pad and the concentration of external damage can be prevented, and the life span of the entire rubber pad can be extended.

In the present invention, an ordinary metal crawler block is used. However, depending on the case, a fiber-reinforced resin block, for example, may be used.

The results of various experiments revealed that damage to the rubber pad could be made insignificant by restricting the thicknesses $h_1$, $h_2$ of the rubber pad to specific ranges.

The reason why $h_1$ is greater than or equal to 20 mm is that, if $h_1$ is too small, when the crawler travels over stones or the like, the rubber pad may be caught between the stone and the crawler block and may be easily damaged.

On the other hand, if $h_2$ is set to greater than or equal to 10×(machine body weight in tons)$^{0.5}$ mm, the thickness of the rubber generally contributes to the durability of the rubber pad, and as the rubber thickness increases, the durability improves. When the rubber pads were used in experiments with different machine bodies, it was found that $h_2$ was proportional to the square root of the weight of the machine body used in the experiment. On the basis of this discovery, the range of $h_2$ was restricted. It is preferable that $h_2$ also is greater than or equal to 20 mm for the same reasons as $h_1$.

In the present invention, the rubber pad is formed at the outer side surface and the inner side end surface of the crawler block at the crawler rubber pad. The four peripheral portions of the ground-contacting surface of the rubber pad are more thick than the central portion. In this way, peeling of the rubber pad from the crawler block can be prevented, and the load of the machine body can be applied uniformly to the rubber pad. Therefore, the life span of the rubber pad can be improved.

An eleventh aspect of the present invention is a crawler comprising: connecting members; links connected by said connecting members in an endless shape; crawler blocks attached to outer side surfaces of said links; and rubber pads formed integrally, by vulcanization and adhesion, with outer side surfaces of said crawler blocks and both end portions of said crawler blocks as seen in a longitudinal direction of said links, and for a space between adjacent rubber pads at a region where said rubber pads are positioned horizontally, a value F/P is 0 to 20%, wherein P is a link pitch, and F is the space between said rubber pads.

In a twelfth aspect of the present invention, in the eleventh aspect, given that a distance from an end portion of said rubber pad to the end portion of said crawler block which is nearest to said end portion of said rubber pad is G, a value G/P is 5 to 25(%).

A thirteenth aspect of the present invention is a crawler comprising: connecting members; links connected by said connecting members in an endless shape; crawler blocks attached to outer side surfaces of said links; and rubber pads formed integrally, by vulcanization and adhesion, with outer side surfaces of said crawler blocks and both end portions of said crawler blocks as seen in a longitudinal direction of said links, and a space between adjacent rubber pads at a region where said rubber pads are positioned horizontally is 0 to −10 mm.

In a fourteenth aspect of the present invention, in the thirteenth aspect, grooves are formed along a longitudinal direction of said crawler block in inner side surfaces of portions of said rubber pad which portions are in vicinities of the both end portions of said crawler block.

The rubber pad which is formed integrally with the crawler block is formed by vulcanization and adhesion. In particular, the rubber pad is formed integrally at the end portions of the crawler block. When the crawler blocks are connected so as to form the crawler, the space between adjacent rubber pads is restricted to a particular range. Even if reverse bending occurs, adjacent rubber pads promptly contact each other so as to check the reverse bending.

In accordance with the present invention, when the crawler is trained around an idler or the like, the opening between adjacent rubber pads is made smaller so that small stones or the like are seldom caught between the rubber pads, and the life span of the crawler can be extended.

The present invention may be a crawler in which, when the crawler is disposed horizontally, in a case in which there exists a space between rubber pads formed on adjacent crawler blocks, as illustrated in FIG. 35, the value F/P (%) may be 0 to 20%, preferably 3 to 20%, wherein P is the link pitch and F is the space between the pads. In this case, because the rubber pads do not contact each other, the condition regarding the space therebetween (i.e., the F/P value) is expressed as a ratio with respect to the size of the rubber pad.

In this case, when the crawler travels over stones or the like, it is difficult for reverse bending to occur because F is set in a narrow range with respect to P. When F is wide, small stones or the like may become caught in the space. In the former case, the input load on the rubber pad, such as the weight of the machine body or the like, is large. In the latter case, the load is placed on the rubber pad and the links.

As a result, the F/P value is specified in consideration of the durability of the rubber pad. Depending on the case, in FIG. 20, the region G of the rubber pad on which a particularly large load is placed may be set to a predetermined thickness.

When the crawler is disposed horizontally, in a case in which the rubber pads formed on adjacent crawler blocks contact each other, the space therebetween is 0 to −10 mm. Namely, in a case in which adjacent blocks contact each other when the rubber pads are horizontal, even if contact arises due to the resiliency of the rubber blocks, the length of the space is set to a real number in a range which allows for the absorption of this contact. A crawler equipped with pads having such spaces is provided sufficiently and practically. In this way, if there are no spaces between the rubber pads, the phenomena of reverse bending and small stones getting caught between the rubber pads can be prevented.

By forming grooves which are perpendicular to the longitudinal direction of the crawler, i.e., grooves along the longitudinal direction of the crawler block, in the inner surface side of the rubber pad provided at the end portions of the crawler block, even if the rubber pads contact each other, the rubber pads can bend easily.

The present invention provides the crawler itself with a function to prevent reverse bending. Even when the crawler is trained around a sprocket or an idler, small stones and the like are not caught in the spaces between the crawler blocks which spaces become wide. The durability of the crawler is improved, and occurrences of derailment can be lessened.

A fifteenth aspect of the present invention is a crawler comprising: connecting members; links connected by said connecting members in an endless shape; crawler blocks attached to outer side surfaces of said links; and rubber pads vulcanized and adhered on outer side surfaces of said crawler blocks to inner side peripheral surfaces thereof, and in order to connect said rubber pads to said links, said rubber pads do not exist at the inner side peripheral surfaces of said crawler blocks to which surfaces said links are adjacent.

In a sixteenth aspect of the present invention, in the fifteenth aspect, regions of said crawler blocks to which said links are adjacent protrude and are exposed further inwardly than inner side surfaces of said rubber pads.

In the present invention, the rubber pad, which protrudes toward the inner peripheral side of the crawler block, does not exist at the regions of connection between the crawler block and the track links. More specifically, the crawler block is set in a manufacturing mold such that the inner surface of the crawler block protrudes inwardly. The protruding rubber does not extend to the inner surface.

In this way, the protruding rubber is not obstructive during the connecting of the crawler block and the track links.

The present invention is commodious for the attaching of the crawler rubber pad and the track links. The crawler rubber pad and the track links can be attached even if the rubber pad flows to the inner peripheral side of the crawler block.

DESCRIPTION OF THE PREFERRED EMBODIMENTS

Hereinafter, embodiments of the crawler block rubber pad of the present invention will be described in detail with reference to the drawings.

Figure 1:
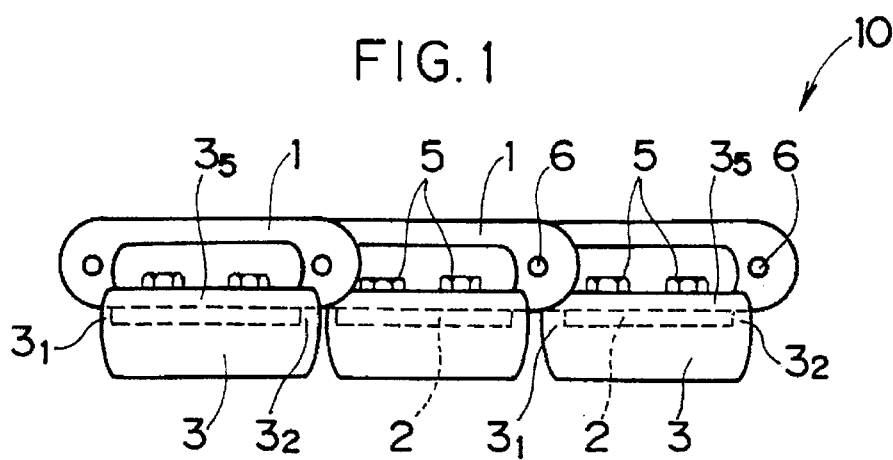
FIG. 1 is a side view of a crawler using a crawler block rubber pad of the present invention.
Figure 2A:
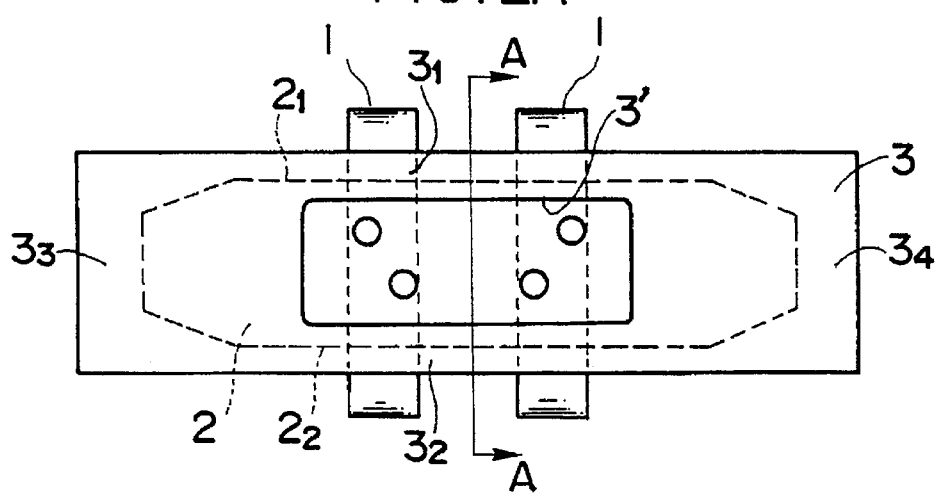
FIG. 2A is a ground-contacting surface side plan view illustrating a first embodiment of a crawler block rubber pad of the present invention.
Figure 2B:
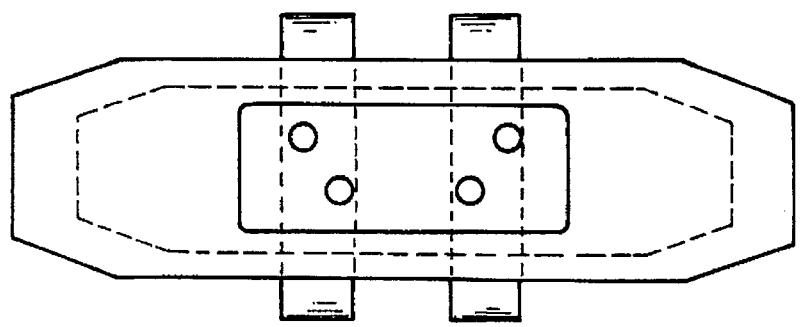
FIG. 2B is a ground-contacting surface side plan view illustrating a variant example of the first embodiment of the crawler block rubber pad of the present invention.
Figure 3:
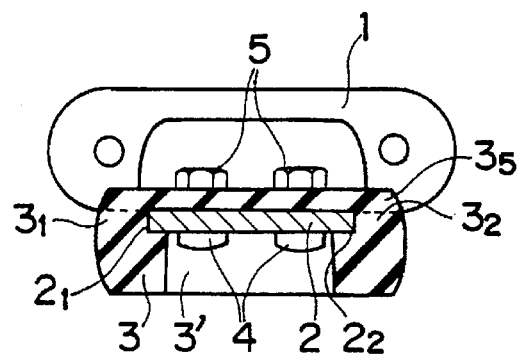
FIG. 3 is a cross sectional view taken along line A—A of FIG. 2A.

FIG. 1 is a side view of a crawler 10 using the crawler block rubber pad of the present invention. FIGS. 2A, 2B are ground-contacting surface side plan views illustrating the first embodiment of the crawler block rubber pad of the present invention. FIG. 3 is a cross sectional view taken along line A—A of FIG. 2.

In the drawings, reference numeral 1 is a link, 2 is a crawler block, and 3 is a rubber pad. Bolts 4 are inserted from a central recess 3' of the rubber pad 3, and are screwed with nuts 5 so that the links 1 and the crawler block 2 are fixed integrally. The links 1, 1 are axially supported by pins 6 so as to form an endless structure.

The rubber pad 3 covers the outer surface of the crawler block 2. Rubber materials $3_1$, $3_2$, which are portions of the rubber pad 3, are vulcanized and adhered integrally to end portions $2_1$, $2_2$ of the crawler block 2 in the longitudinal direction of the crawler 10. In the present embodiment, the respective widths of the rubber materials $3_1$, $3_2$ are equal.

Figure 42A:
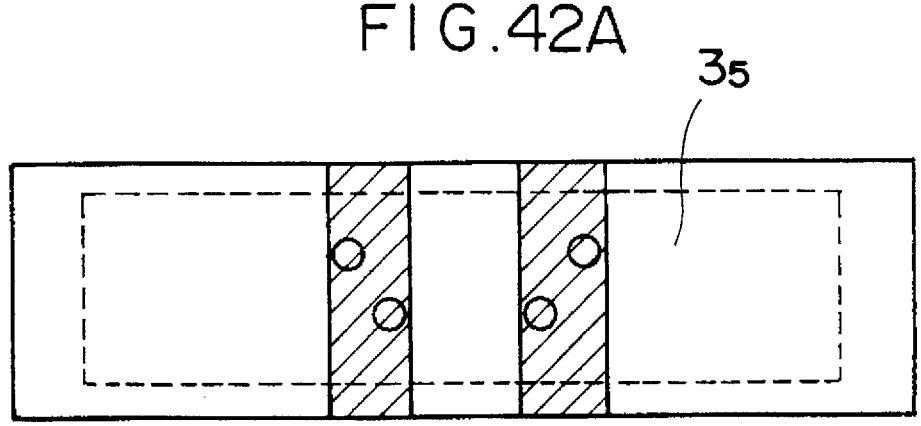
FIG. 42A is a reverse surface side plan view of a rubber pad and a crawler block in which rubber has been removed from the surface of the crawler block to which surface links are attached.
Figure 42B:
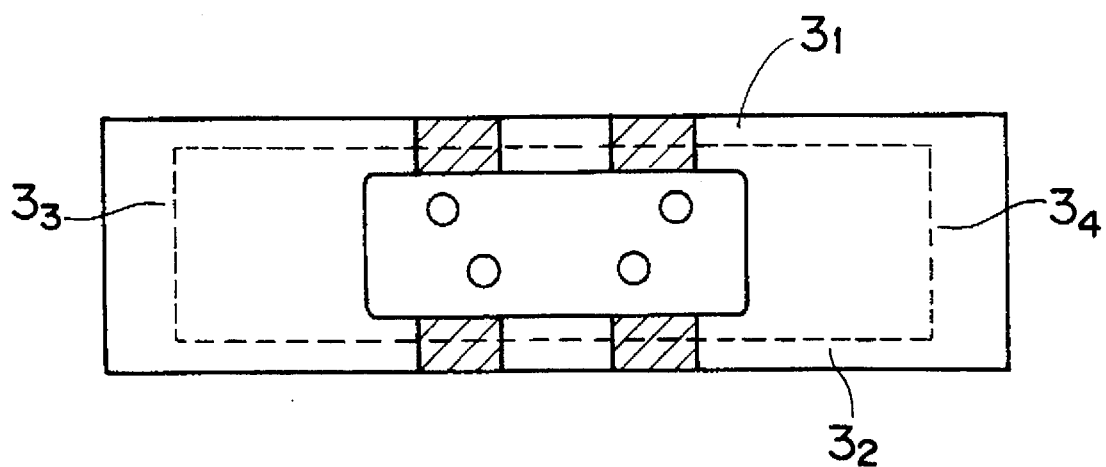
FIG. 42B is a reverse surface side plan view of a rubber pad and a crawler block in which rubber has been removed from the surface of the crawler block to which surface links are attached.

The crawler block 2 may have the same dimension to the transverse ends thereof. However, in the present embodiment, the transverse end portions of the crawler block 2 are formed so as to have somewhat smaller widths. The rubber materials $3_1$, $3_2$, $3_3$, $3_4$ are formed at the respective peripheral ends of the crawler block 2, and in the present embodiment, extend to the reverse side of the crawler block 2. Forming the rubber material $3_5$ at the reverse side of the crawler block 2, i.e., at the link 1 side of the crawler block 2, prevents peeling of the rubber pad 3 from the crawler block 2. As illustrated in FIGS. 42A and 42B, it is preferable that the links 1 are attached to the crawler block 2 after the rubber, which adhered to the surface of the crawler block 2 to which the links 1 are attached, has been removed.

Due to the transverse end portions of the crawler block 2 being tapered as illustrated, the stresses on the rubber pad 3 can be made equal at the central portion and the end portions of the crawler block 2. The durability of the rubber pad 3 is substantially equal at the respective portions thereof, and the life span of the rubber pad 3 can be extended.

These advantageous effects can be further promoted by, as illustrated in FIG. 2B, narrowing the transverse end sides of the ground-contacting top surface of the rubber pad 3 to conform to the configuration of the crawler block 2. In particular, the tractive force on damp or wet ground can thereby be improved.

The same effect can be achieved by forming the transverse end portions of the crawler block 2 as curved surfaces. As the curvature increases, the effect improves.

Figure 4:
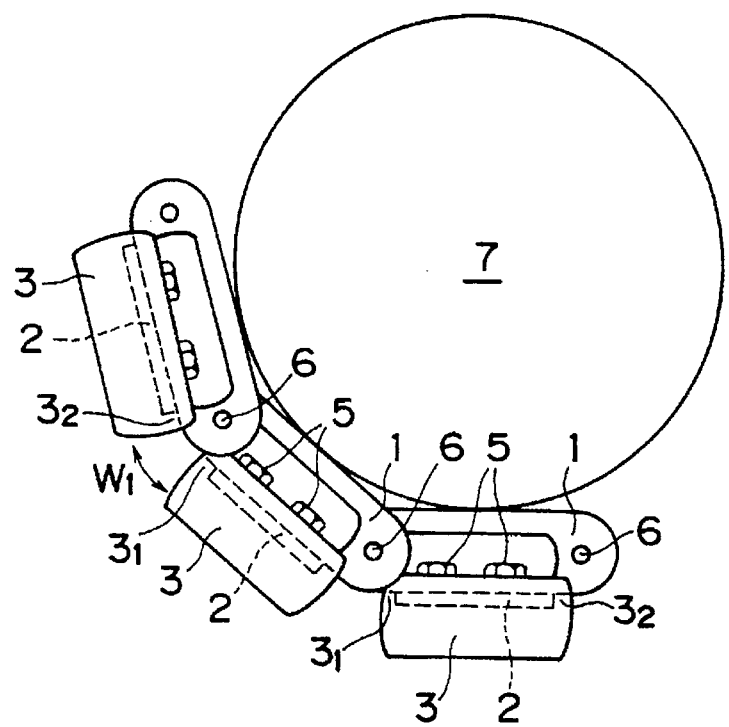
FIG. 4 is a side view illustrating a state in which the crawler illustrated in FIG. 3 is trained around an idler.

FIG. 4 is a side view illustrating a state in which the crawler 10 illustrated in FIG. 3 is trained around an idler 7.

Figure 37:
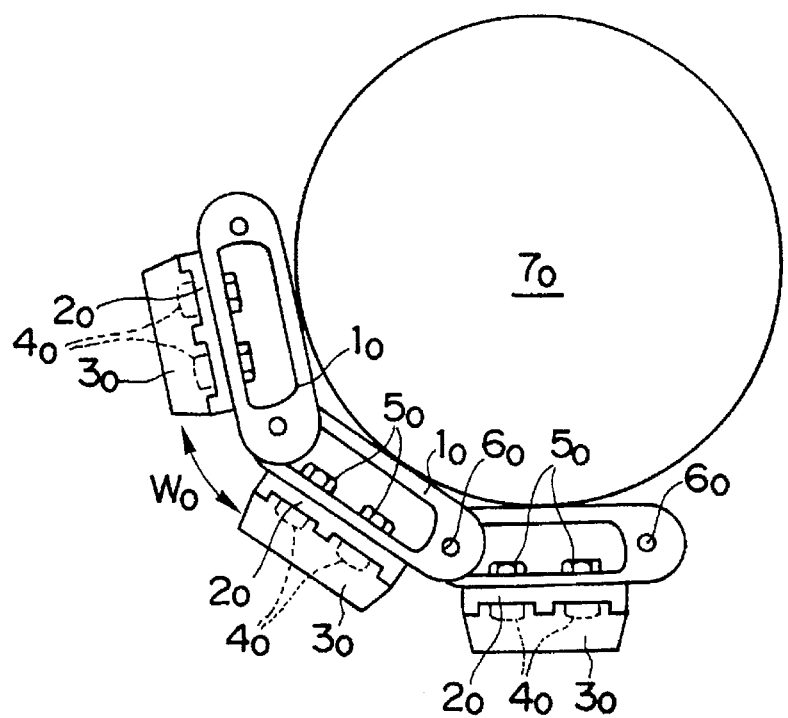
FIG. 37 is a side view illustrating a state in which the crawler of FIG. 36 is trained around an idler.
Figure 38:
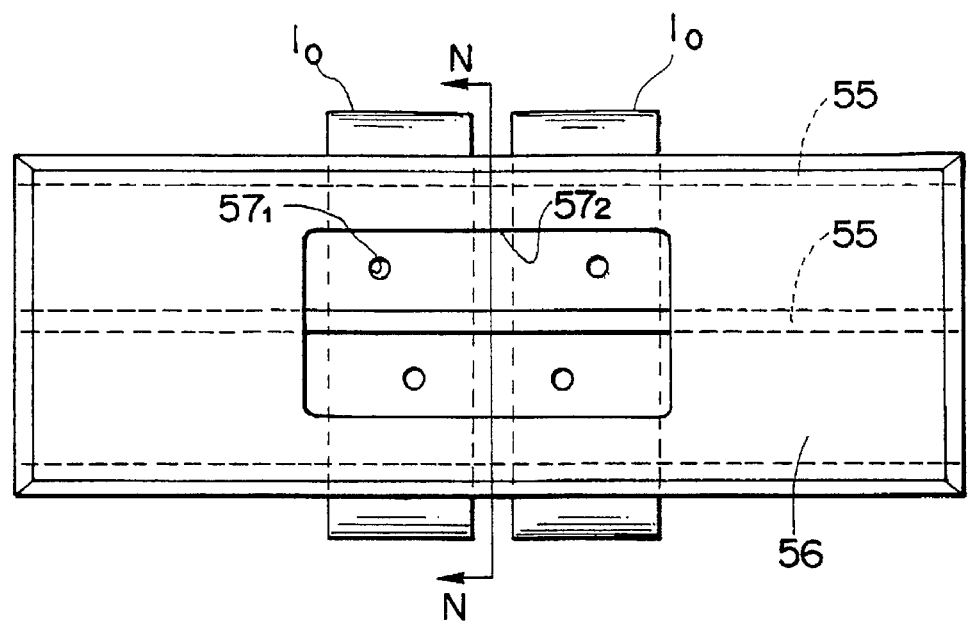
FIG. 38 is a ground-contacting surface side plan view illustrating an example of a conventional crawler rubber pad.
Figure 39:
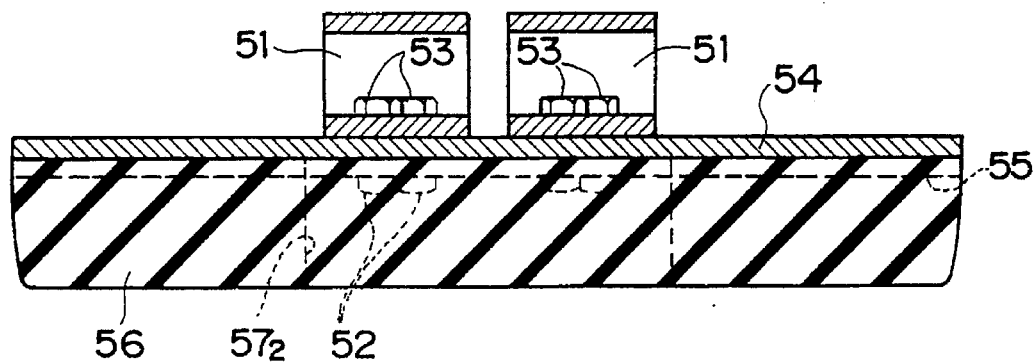
FIG. 39 is a side view illustrating the crawler rubber pad illustrated in FIG. 38.
Figure 40:
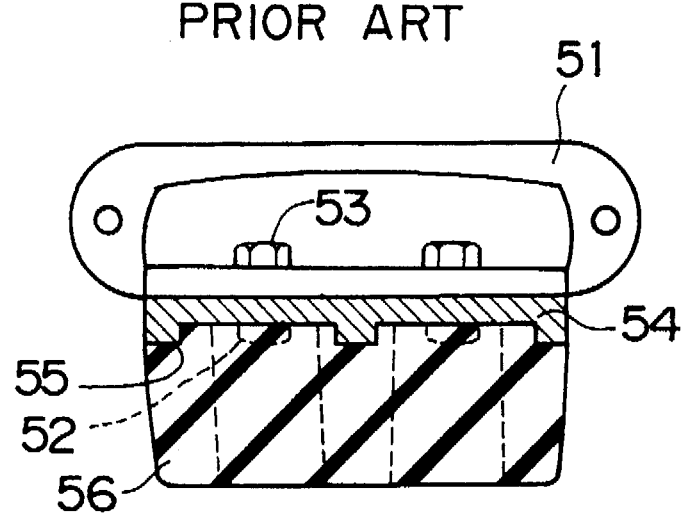
FIG. 40 is a cross sectional view taken along line N—N of the crawler rubber pad shown in FIG. 38.
Figure 41:
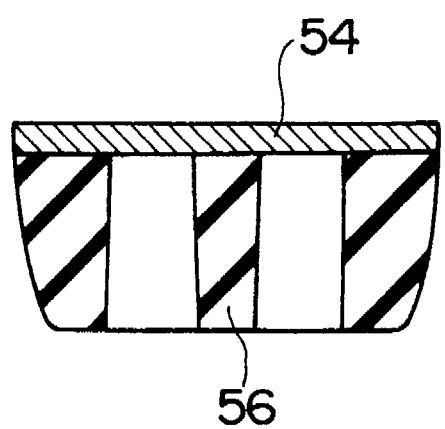
FIG. 41 is a cross sectional view similar to FIG. 40, illustrating another example of a conventional crawler rubber pad.

As can be seen from FIG. 4, the opening $W_1$ between the rubber pads 3, 3 of the present invention which cover the crawler blocks 2 is quite small as compared with the opening $W_0$ when conventional crawler blocks $2_0$ are trained, as illustrated in FIG. 37.

It is preferable that the width of each of the rubber materials $3_1$, $3_2$ is a width which eliminates as much as possible the space between the crawler blocks when the crawler 10 is trained around sprockets or the like. However, if the width of each rubber material $3_1$, $3_2$ is made too large, unwanted force is applied to the pins and the crawler blocks 2 when the crawler 10 is in a horizontal region.

Accordingly, it is preferable that the widths of the rubber materials $3_1$, $3_2$ of the rubber pad 3 are about 5 to 10 mm smaller than the space between adjacent crawler blocks 2, 2, i.e., the crawler block pitch, when the rubber pads 3 are disposed horizontally.

In order to prevent so-called reverse bending, the crawler block width may be larger than the mounting pitch of the crawler block 2. However, in this case as well, the crawler block width should be no more than about 5 to 10 mm larger than the crawler block pitch.

Figure 5:
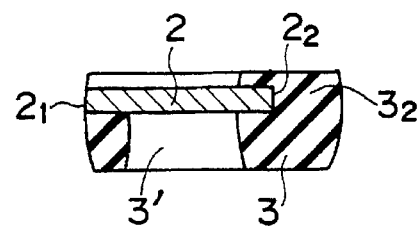
FIG. 5 is a similar view to FIG. 3, and illustrates a second embodiment of a crawler block rubber pad of the present invention.

FIG. 5 is a similar drawing to FIG. 3, and illustrates a second embodiment of the crawler block rubber pad of the present invention. In the present embodiment, no rubber material is formed at one side of the crawler block 2, and the rubber material $3_2$ is formed at the other side thereof. The rubber material $3_5$ may cover the reverse side of the crawler block 2, i.e., the link 1 side of the crawler block 2, as illustrated in FIG. 3. However, in the present embodiment, the rubber material $3_5$ is not formed at the reverse side of the crawler block 2.

Figure 6A:
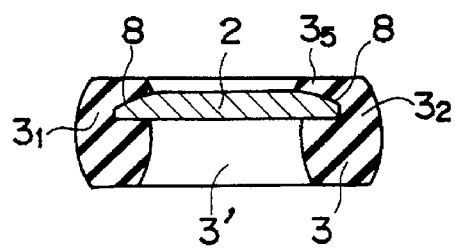
FIG. 6A is a similar view to FIG. 3, and illustrates a third embodiment of a crawler block rubber pad of the present invention.

FIG. 6A is similar to FIG. 3, and illustrates a third embodiment of the crawler block rubber pad of the present invention. In the present embodiment, taper portions 8 are formed at the reverse sides of the lengthwise end portions of the crawler block 2 (i.e., the end portions of the crawler block 2 in the longitudinal direction of the crawler 10). The taper portions 8 are formed at the side of the crawler block 2 toward the links 1. The rubber materials from the taper portions 8 of the crawler block 2 to the end portions of the rubber material $3_5$ at the link 1 side are formed so as to be thick. In this way, strain can be dispersed and the crawler can be made lightweight.

Figure 6B:
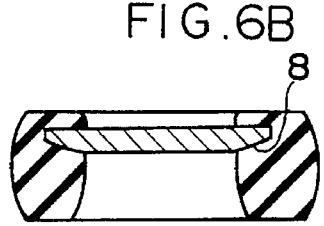
FIG. 6B is a view illustrating a variant example of the third embodiment of the crawler block rubber pad of the present invention.

As illustrated in FIG. 6B, the taper portions 8 can be formed at the ground-contacting surface sides of the lengthwise end portions of the crawler block 2 (the end portions of the crawler block 2 in the longitudinal direction of the crawler).

Figure 7:
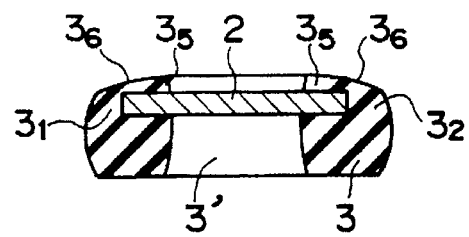
FIG. 7 is a similar view to FIG. 3, and illustrates a variant example of the crawler block rubber pad of the present invention.
Figure 8:
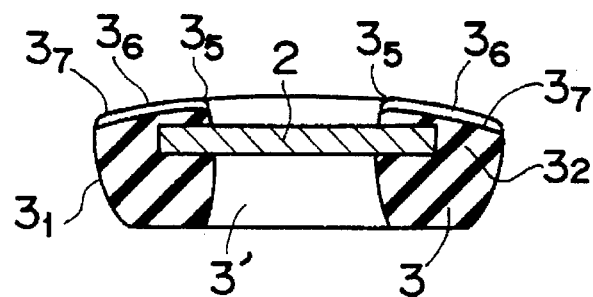
FIG. 8 is a similar view to FIG. 3, and illustrates another variant example of the crawler block rubber pad of the present invention.

As illustrated in FIG. 7, it is desirable to form a taper $3_6$ which tapers along the rubber material $3_5$, which is formed at the reverse side of the crawler block 2, toward the lengthwise end of the rubber pad 3. In certain cases, as illustrated in FIG. 8, a groove $3_7$ may be formed in the rubber material $3_5$ at the reverse side.

Figure 9:
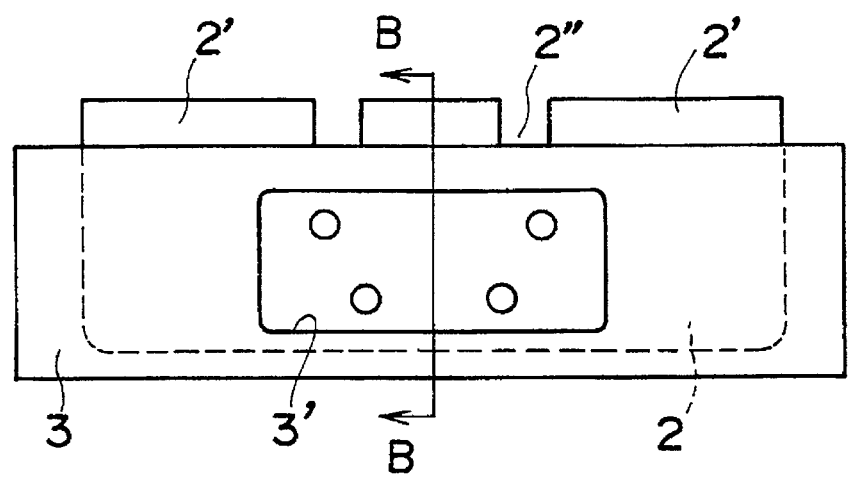
FIG. 9 is a similar view to FIG. 2A, and illustrates a fourth embodiment of the crawler block rubber pad of the present invention.
Figure 10:
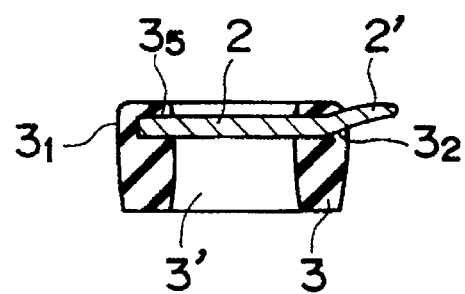
FIG. 10 is a cross sectional view taken along line B—B of FIG. 9.

FIG. 9 is a ground-contacting surface side plan view in a fourth embodiment in which the rubber pad of the present invention is applied to a crawler block 2 with pawl plates 2' which overlap the space between adjacent crawler blocks 2. FIG. 10 is a cross sectional view of main portions, taken along line B—B of FIG. 9. The pawl plates 2' have notch portions 2" for engaging with the links 1.

Fifth through eighth embodiments of the present invention will be described hereinafter with reference to the drawings. Members which are the same as those of the first through fourth embodiments are denoted by the same reference numerals, and description thereof is omitted.

Figure 11:
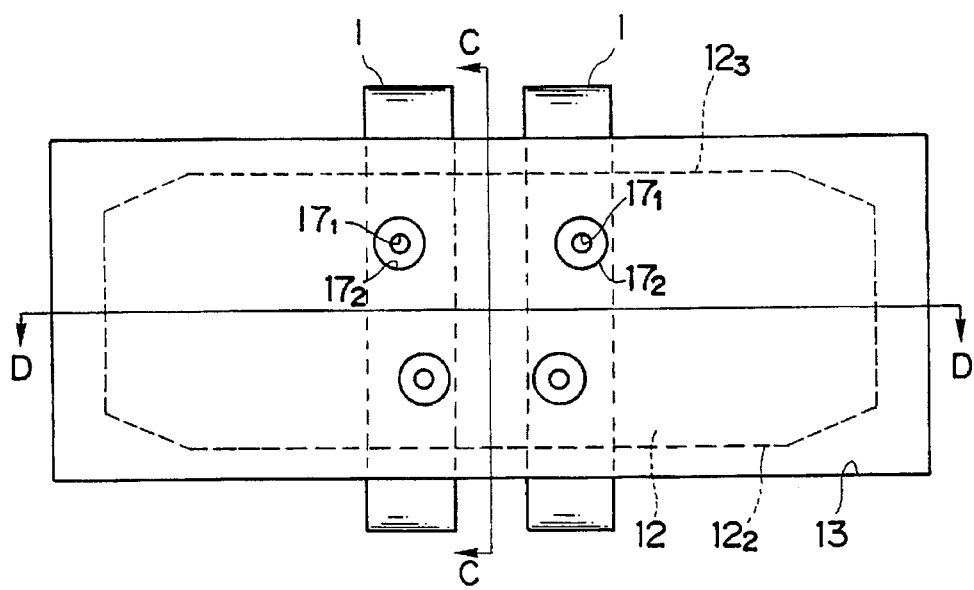
FIG. 11 is a ground-contacting surface side plan view illustrating a fifth embodiment of a crawler block rubber pad of the present invention.
Figure 12:
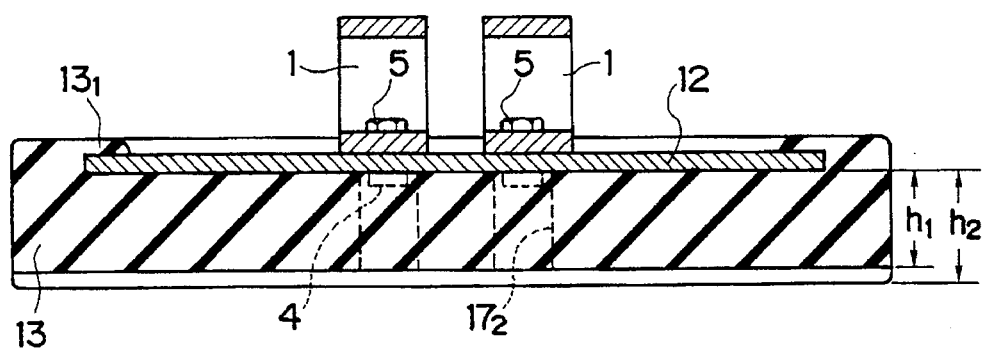
FIG. 12 is a cross sectional view taken along line D—D of the crawler block rubber pad of FIG. 11.
Figure 13:
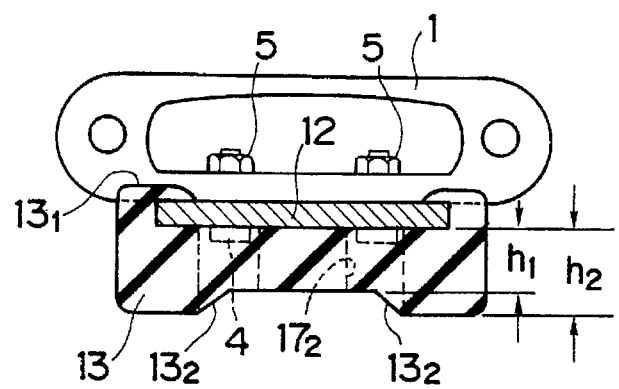
FIG. 13 is a cross sectional view taken along line C—C of the crawler block rubber pad of FIG. 11.

FIG. 11 is a ground-contacting surface side plan view illustrating a fifth embodiment of the crawler block rubber pad of the present invention. FIG. 12 is a cross sectional view taken along line D—D of FIG. 11, and FIG. 13 is a cross sectional view taken along line C—C of FIG. 11.

In the drawings, reference numeral 1 is the link. A metal crawler block 12 is attached to the links 1 by the bolts 4 and the nuts 5. A rubber pad 13 is vulcanized and adhered on the outer side surface, i.e., the ground-contacting surface side, to the inner side end surface of the metal crawler block 12. Holes $17_1$, $17_2$, in which the bolts 4 are inserted, are formed in the metal crawler block 12 and the rubber pad 13. The outer surfaces of the metal crawler blocks 12 in a plane parallel to the endless direction when the crawler block rubber pads are connected endlessly form a flat surface.

In this way, the rubber pad 13 is vulcanized and adhered to the outer side surface of the metal crawler block 12, and a rubber material $13_1$ extends to the inner side end surface of the metal crawler block 12. Therefore, peeling of the rubber pad 18 from the metal crawler block 12 can be deterred.

The thickness of the central portion of the rubber pad 13 at a region along longitudinal (lengthwise) ends $12_2$, $12_3$ of the metal crawler block 12 viewed from the transverse direction of the crawler is $h_1$. The thickness $h_1$ is smaller than the thickness $h_2$ of the peripheral portions. The figures illustrate an example in which inclined surfaces $13_2$ are provided from the central portion of the rubber pad to the peripheral portions.

Figure 14:
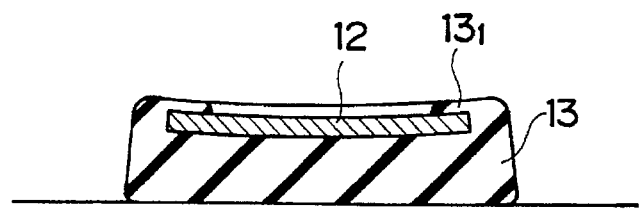
FIG. 14 is a view illustrating the state of a region in FIG. 13 when the crawler block rubber pad of the present invention is used.

As a result, as illustrated in FIG. 14, when the crawler block rubber pads are connected to the links 1 and used, the rubber pads 13 elastically deform and protrude toward the outer sides, and the metal crawler block 12 bends due to the load applied thereto. As a result, even if load is applied to the machine body, because the rubber pad 13 is provided substantially uniformly on the entire surface of the metal crawler block 12, the surface pressure is substantially uniform and the strain on the rubber pad 13 does not concentrate at one portion.

Figure 15:
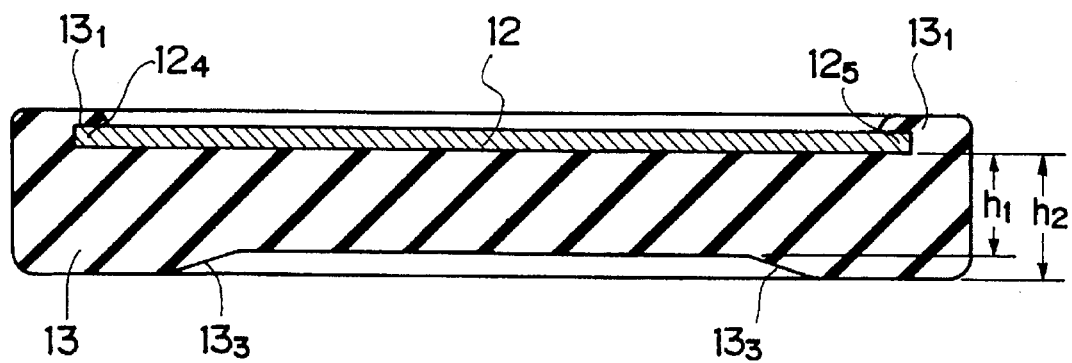
FIG. 15 is a cross sectional view of a sixth embodiment of a crawler block rubber pad of the present invention.

FIG. 15 is a cross sectional view of a sixth embodiment of the crawler block rubber pad of the present invention. In the present embodiment, the rubber pad 13 corresponding to ends $12_4$, $12_5$ of the metal crawler block 12 forms tapered surfaces $13_3$, and the thickness $h_2$ is large.

Figure 16:
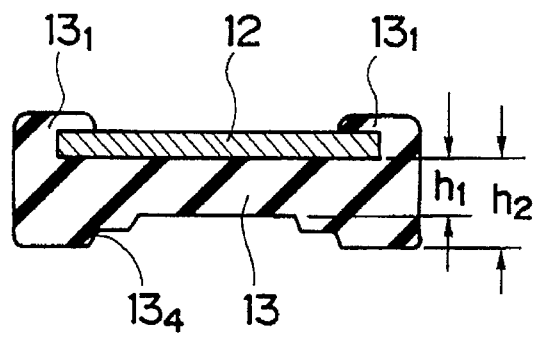
FIG. 16 is a cross sectional view, which is similar to FIG. 13, in a seventh embodiment of a crawler block rubber pad of the present invention.

FIG. 16 is a cross sectional view which is similar to FIG. 13 and illustrates a seventh embodiment of the crawler block rubber pad of the present invention. In the present embodiment, stepped portions $13_4$ are formed from the central portion of the rubber pad 13 to the peripheral portions such that the thickness $h_2$ of a region along the longitudinal ends $12_2$, $12_3$ of the metal crawler block 12 is greater than the thickness $h_1$ of the central portion.

Figure 17:
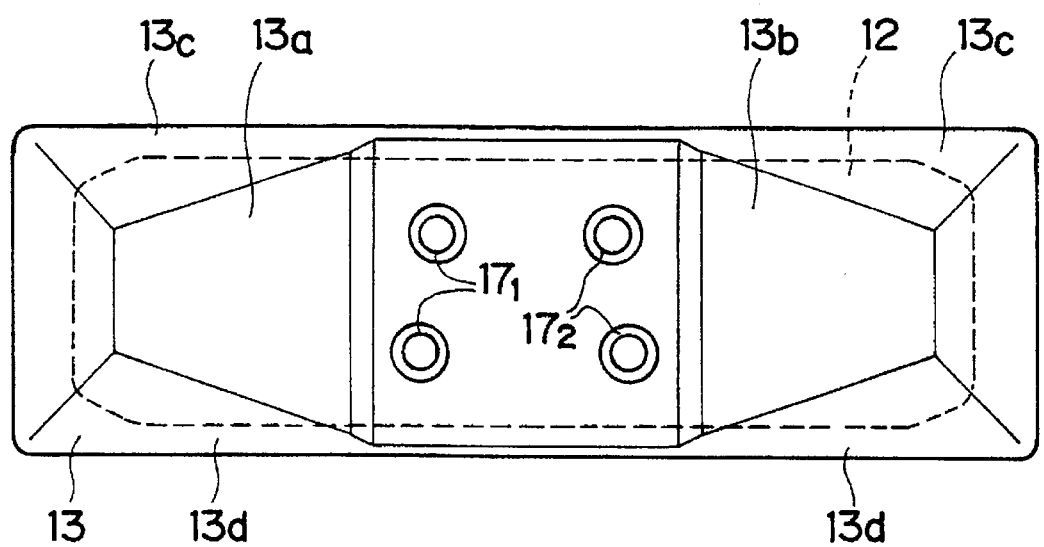
FIG. 17 is a ground-contacting surface side plan view of an eighth embodiment of a crawler block rubber pad of the present invention.
Figure 18:
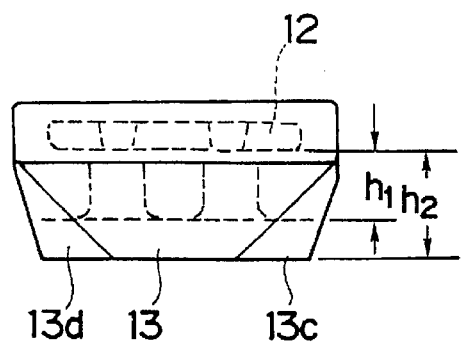
FIG. 18 is a side view of the crawler block rubber pad of FIG. 17.
Figure 19:
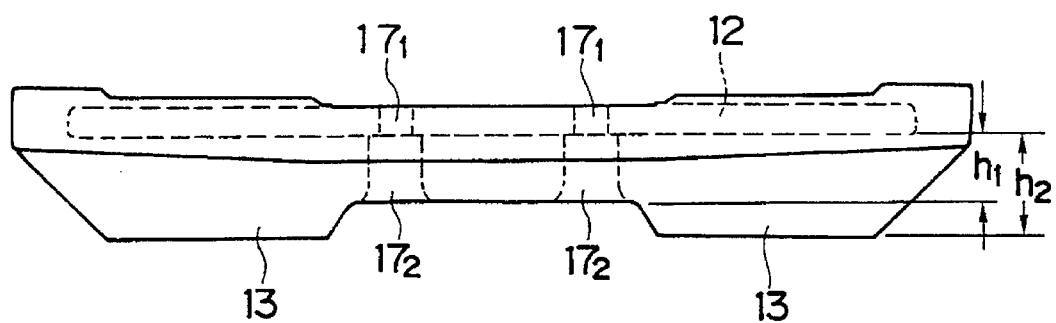
FIG. 19 is a front view of the crawler block rubber pad of FIG. 17.

FIG. 17 is a ground-contacting surface side plan view in the eighth embodiment of the crawler block rubber pad of the present invention. FIG. 18 is a side view thereof, and FIG. 19 is a front view thereof.

In this crawler block rubber pad, because the thickness $h_1$ of the central portion of the rubber pad 13 is quite small, the rubber pad 13 is divided into rubber materials 13a, 13b at the left and the right in the longitudinal direction of the crawler block 12, and the rubber pads 13a, 13b are trapezoidal. Further, as both end portions of the rubber pads 13 become the longitudinal ends, they become inclined surfaces 13c, 13d which are cut out to a large degree.

The relationship between the machine body weight and durability of the crawler block rubber pad having this configuration was determined by experimentation. It was found that durability is proportional to $h_2$, that the rubber thickness (height) $h_2$ is substantially proportional to the square root of the machine body weight, and that durability is improved.

The following dimensions provide crawler block rubber pads which are appropriate with respect to durability and the amount of consumed rubber: for a machine body weight of about 4 to 6 tons, $h_1$ is 20 mm and $h_2$ is 35 mm; for a machine body weight of about 6 to 8 tons, $h_1$ is 22 mm and $h_2$ is 42 mm; for a machine body weight of about 10 to 13 tons, $h_1$ is 38 mm and $h_2$ is 58 mm; and for a machine body weight of 18 to 20 tons, $h_1$ is 40 mm and $h_2$ is 70 mm.

Figure 34:
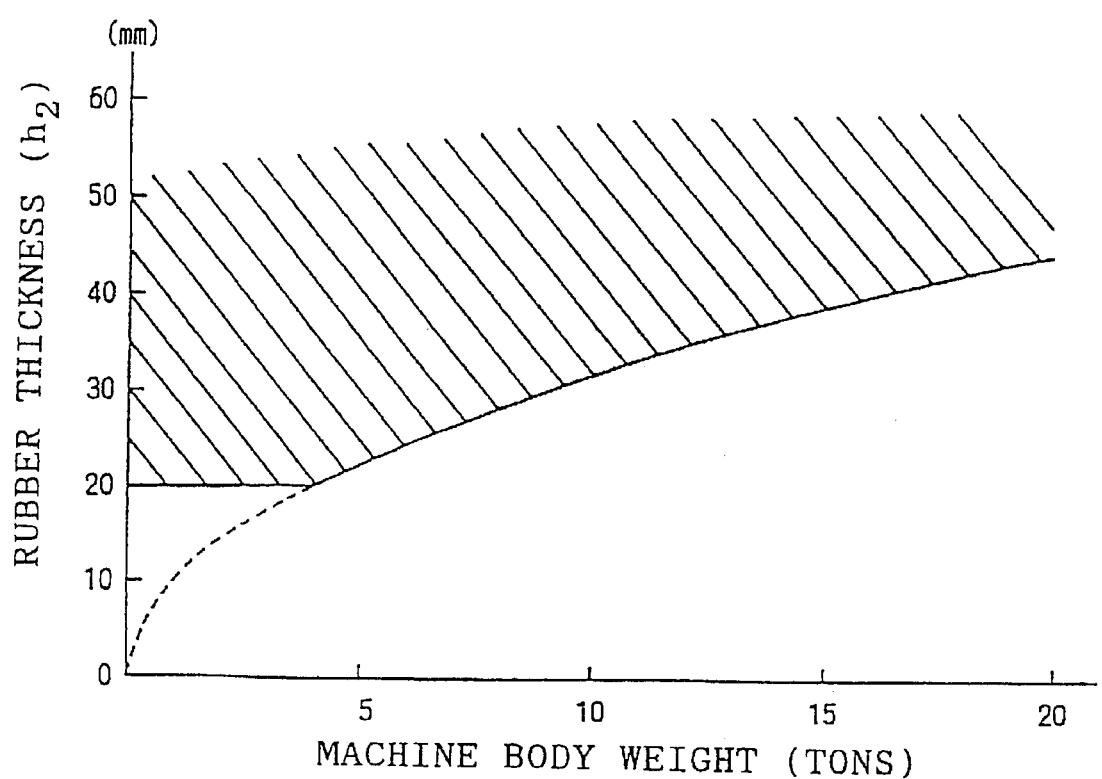
FIG. 34 is a graph illustrating the relationship between machine body weight and thickness of the rubber pad illustrating the durability of the crawler block rubber pad of the present invention.
Figure 35:
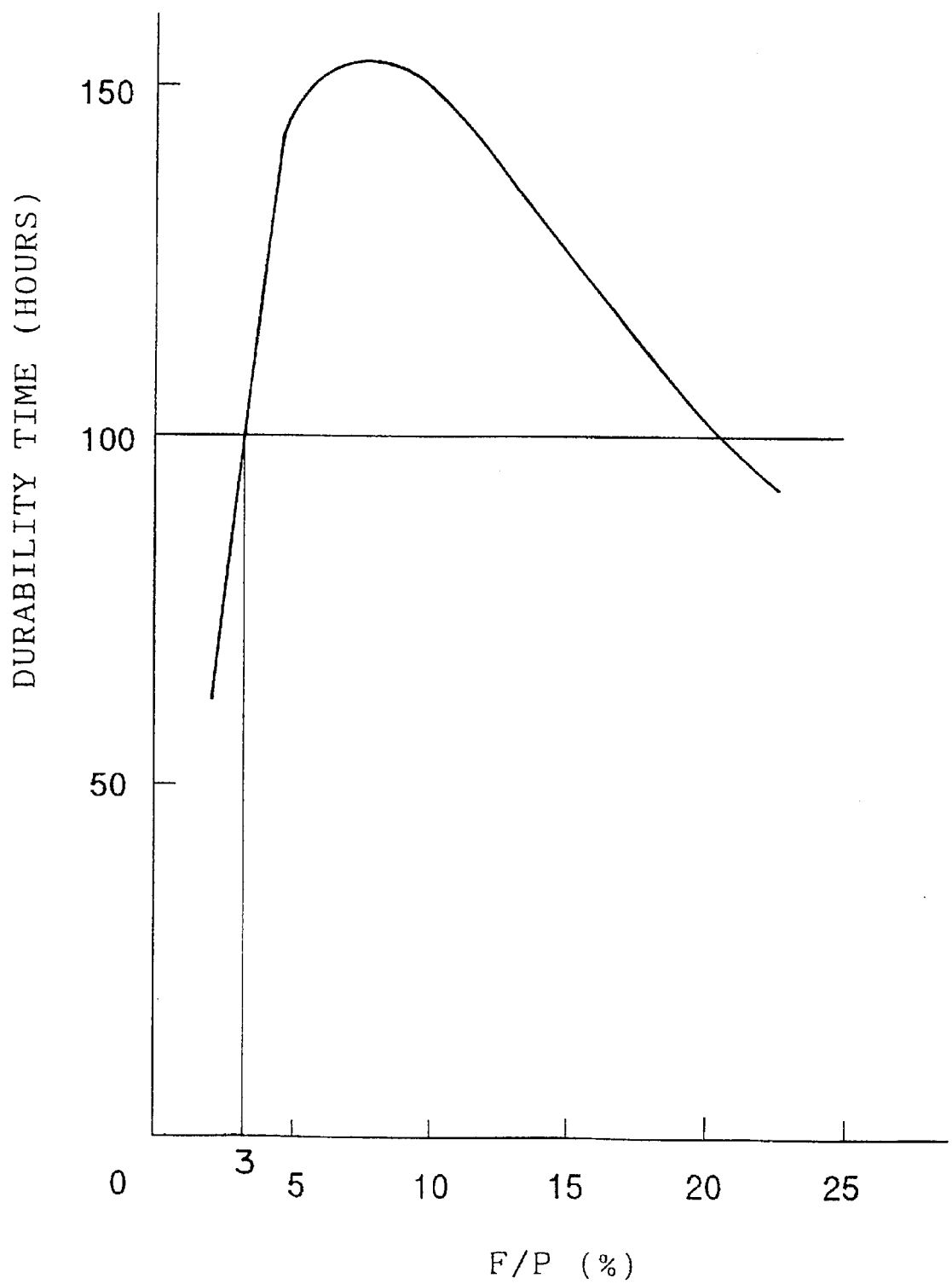
FIG. 35 is a graph illustrating the relationship between durability time and the F/P value of the crawler block rubber pad of the present invention.
Figure 36:
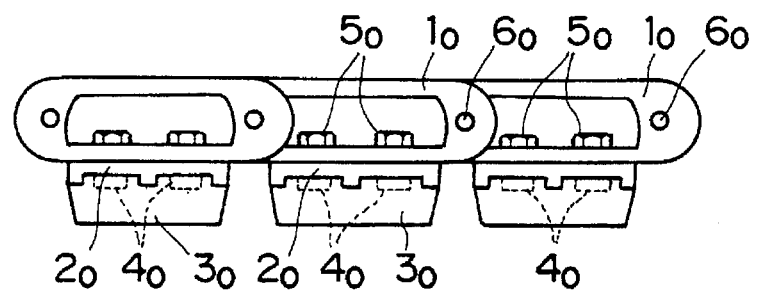
FIG. 36 is a side view of a crawler using crawler blocks equipped with conventional rubber pads.

FIG. 34 is a graph illustrating the relationship between machine body weight and rubber pad thicknesses (heights) $h_2$ showing durability of the crawler block rubber pad of the present invention. The hatched region in the drawing is a range in which durability was obtained for 50 or more hours in a running state. This figure illustrates that in a case in which the machine body weight is 16 tons, if the minimum pad depth $h_2$ is 40 mm, the durability standards can be met. Further, in cases of machine body weights of 4 tons or less, it is necessary to make the pad thickness at least 20 mm. The minimum value of the pad thickness is as illustrated by the data in FIG. 34. The maximum value is determined by the state in which the crawler is mounted to the main body and by the rigidity of the crawler itself.

Figure 20:
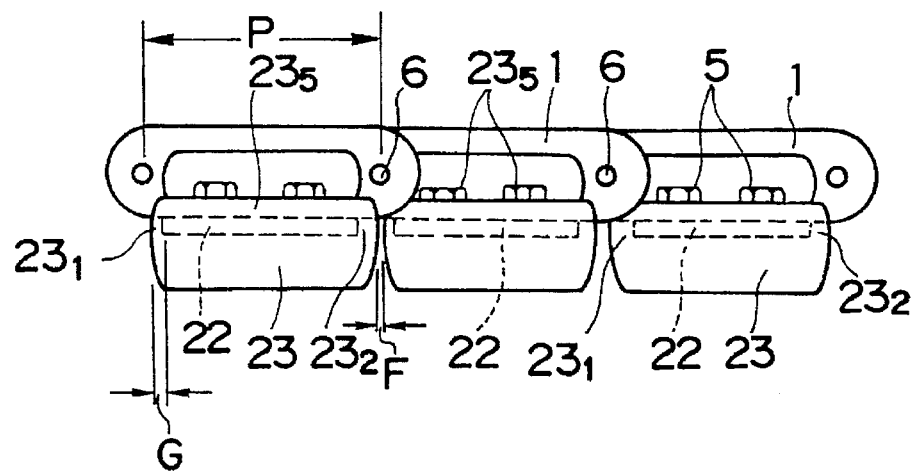
FIG. 20 is a side view of a crawler of a ninth embodiment of the present invention.
Figure 21:
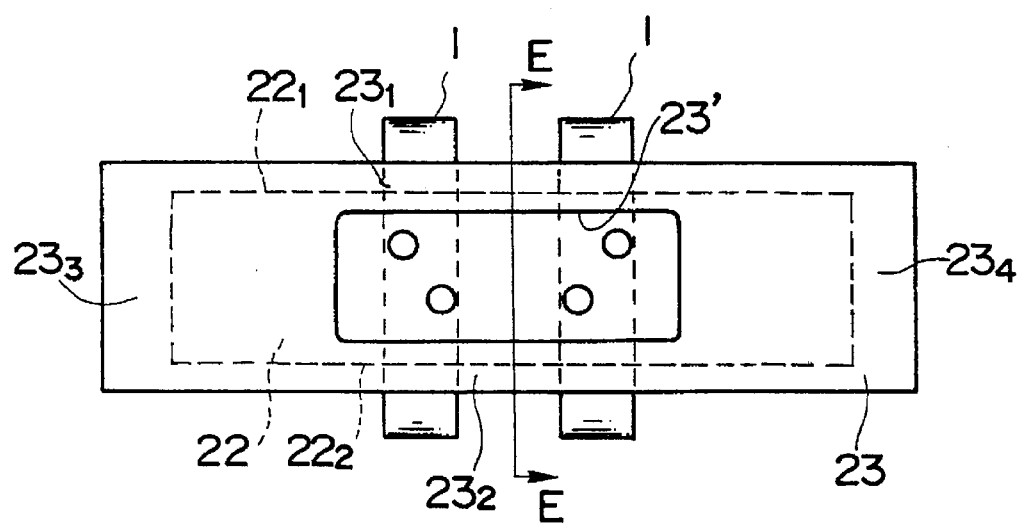
FIG. 21 is a ground-contacting surface side plan view illustrating a crawler block rubber pad used in the crawler of the ninth embodiment.
Figure 22:
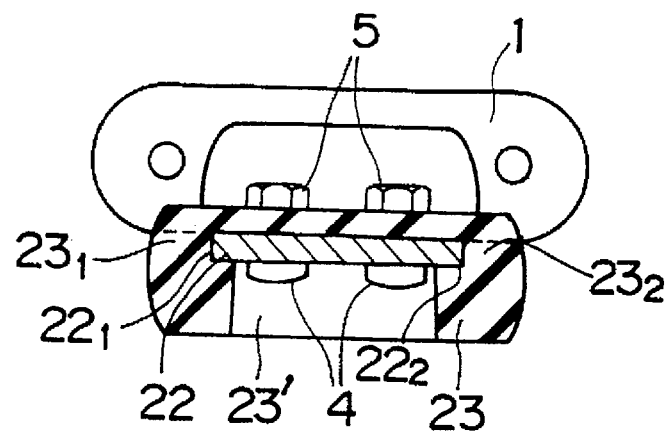
FIG. 22 is a cross sectional view taken along line E—E of FIG. 21.

Hereinafter, ninth through eleventh embodiments of the crawler block rubber pad of the present invention will be described in detail with reference to the drawings. Members which are the same as the first through the fourth embodiments are denoted by the same reference numerals, and description thereof is omitted. FIG. 20 is a side view of a crawler of the ninth embodiment of the present invention. FIG. 21 is an enlarged view of the ground-contacting surface side of one of the crawler blocks. FIG. 22 is a cross sectional view taken along line E—E of FIG. 21.

In the figures, reference numeral 1 is the link, 22 is a crawler block and 23 is the rubber pad. The bolts 4 are inserted from a central recess 23' of the rubber pad 23, and are screwed with the nuts 5 so that the links 1 and the crawler block 22 are fixed integrally. The links 1, 1 are axially supported by pins 6 so as to form an endless structure.

The rubber pad 23 covers the outer surface of the crawler block 22. Rubber materials $23_1$, $23_2$, which are integral with the rubber pad 23, are vulcanized and attached to the end portions $22_1$, $22_2$ of the crawler block 22 in the longitudinal direction of the crawler.

The value F/P of the space F between the rubber pads 23, 23 of adjacent crawler blocks 22, 22 of the crawler and the link pitch P at which the crawler blocks 22 are attached is approximately 2.5% (absolute value 5 mm). In this way, reverse bending of the crawler is suppressed, the life span of the crawler is increased, and the occurrence of a state such as so-called derailment can be lessened.

Further, it is preferable that rubber materials $23_1$, $23_2$, $23_3$, $23_4$ are formed at the entire periphery of the crawler block 22, and in the present embodiment, that they extend to the reverse side of the crawler block 22. Forming the rubber material $23_5$ at the reverse side of the crawler block 22, i.e., at the link 1 side, as well prevents peeling of the rubber pad 23 from the crawler block 22.

Figure 23:
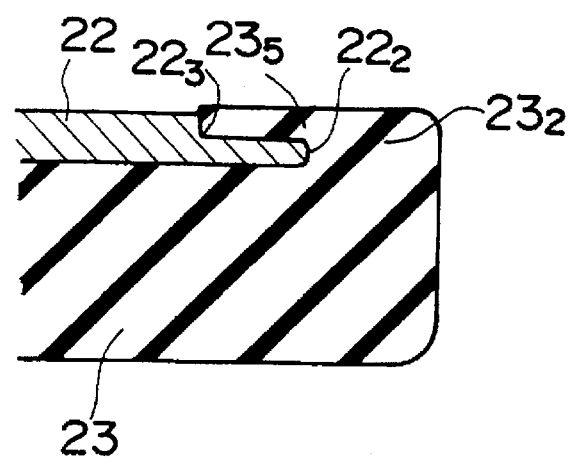
FIG. 23 is an enlarged cross sectional view illustrating a portion of a variant example of the crawler block rubber pad of the ninth embodiment.

FIG. 23 is a partial, expanded view illustrating a variant example of the above-described crawler block. In order to further prevent peeling of the rubber pad 23 from the crawler block 22, step portions $22_3$ are formed at the reverse side ends of the crawler block 22, and the rubber material $23_5$ is adhered to the step portions $22_3$.

Figure 24:
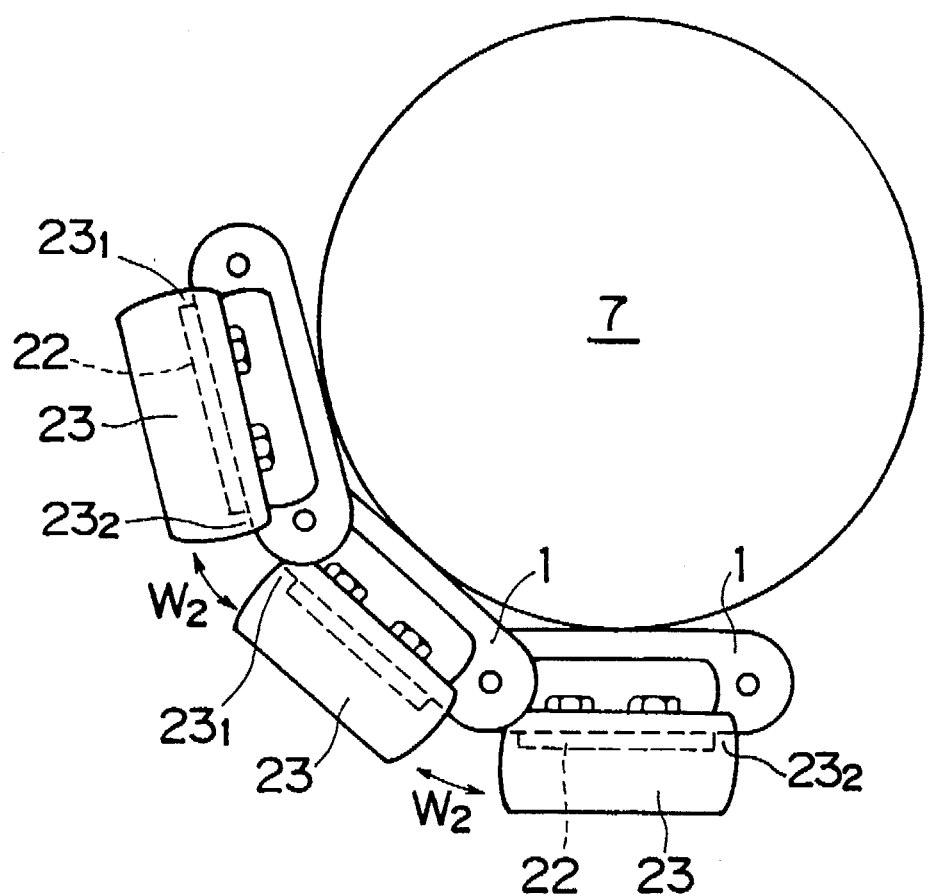
FIG. 24 is a side view illustrating a state in which the crawler illustrated in FIG. 22 is trained around an idler.

FIG. 24 is a side view illustrating a state in which the crawler illustrated in FIG. 20 is trained around the idler 7.

As can be seen from the drawing, the opening $W_2$ between the rubber pads 23, 23 of the present invention which cover adjacent crawler blocks 22 is quite small as compared to the opening $W_0$ when conventional crawler blocks $22_0$ are trained around as illustrated in FIG. 43.

It is preferable that the widths of the rubber materials $23_1$, $23_2$ formed at the end portions of the crawler block 22 are substantially the same.

Figure 25:
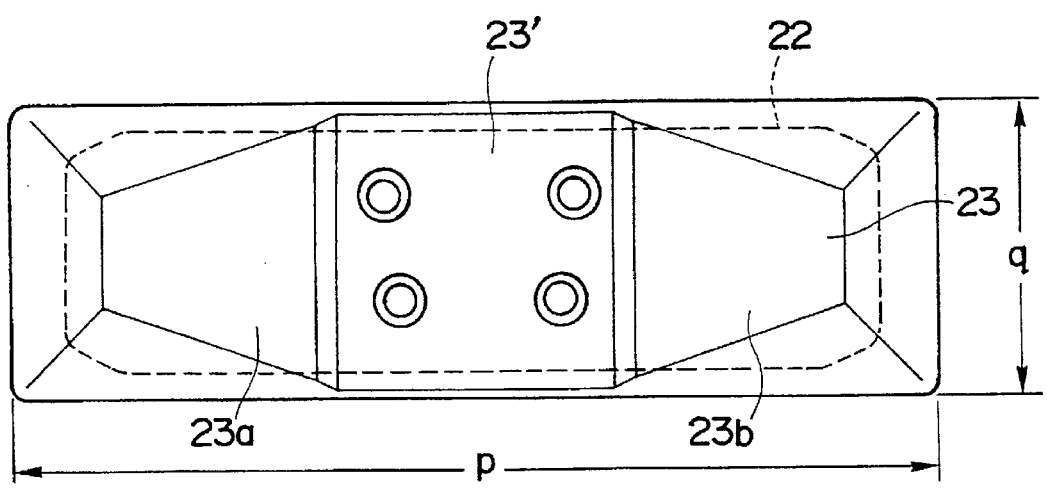
FIG. 25 is a ground-contacting surface side plan view illustrating a first crawler block rubber pad of the tenth embodiment of the present invention.
Figure 26:
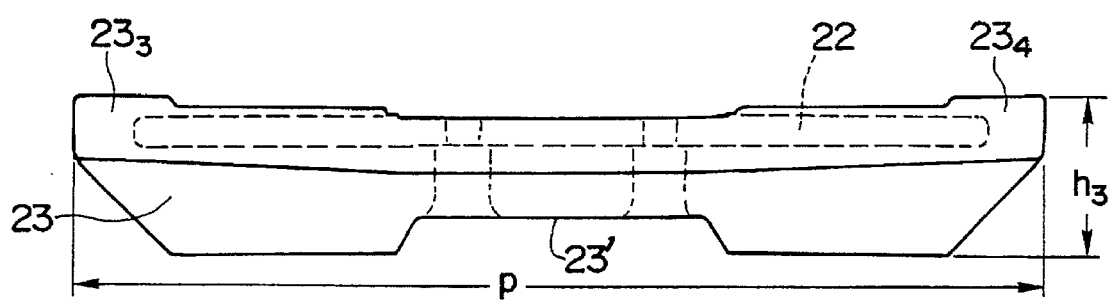
FIG. 26 is a front view of the crawler block rubber pad of FIG. 25.
Figure 27:
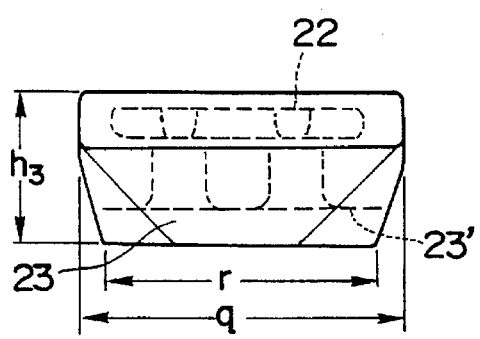
FIG. 27 is a side view of the crawler block rubber pad of FIG. 25.

Hereinafter, the crawler block 22 and the rubber pad 23 of the tenth embodiment of the present invention will be described. FIG. 25 is a ground-contacting surface side plan view. FIG. 26 is a front view, and FIG. 27 is a side view.

The rubber pad 23 is divided into rubber materials 23a, 23b to the left and the right at a thickness of 20 mm by the central recess 23' of the rubber pad 23. The surfaces of the rubber pads 23a, 23b are trapezoidal.

In the present example, the lengthwise width p of the rubber pad 23 is 500 mm, the transverse width q is 165 mm, the height $h_3$ is 85 mm, and the transverse side width r is 140 mm.

The link pitch P (unillustrated) at which the crawler blocks 22 are attached is 175 mm. Accordingly, in the present embodiment, F=10 mm (F/P=5.7%), G=17 mm (G/P=105).

Next, an eleventh embodiment of the present invention will be described. In the present embodiment, the space F between the rubber materials $23_1$, $23_2$ at both sides is less than or equal to zero. Namely, the rubber materials $23_1$, $23_2$ always contact each other when the crawler is disposed horizontally.

Figure 28:
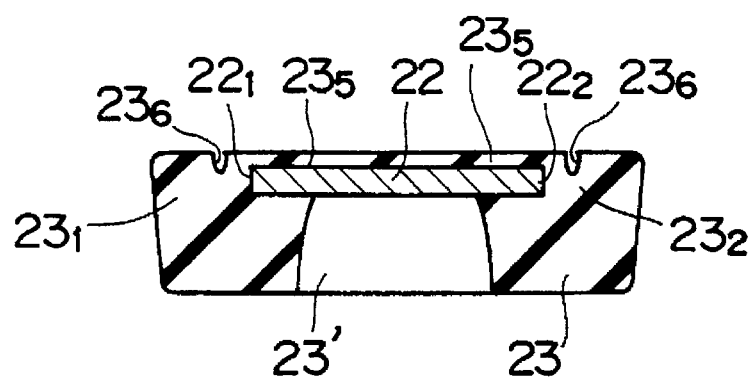
FIG. 28 is a similar view to FIG. 22, illustrating a crawler block rubber pad used in a crawler of an eleventh embodiment of the present invention.
Figure 29:
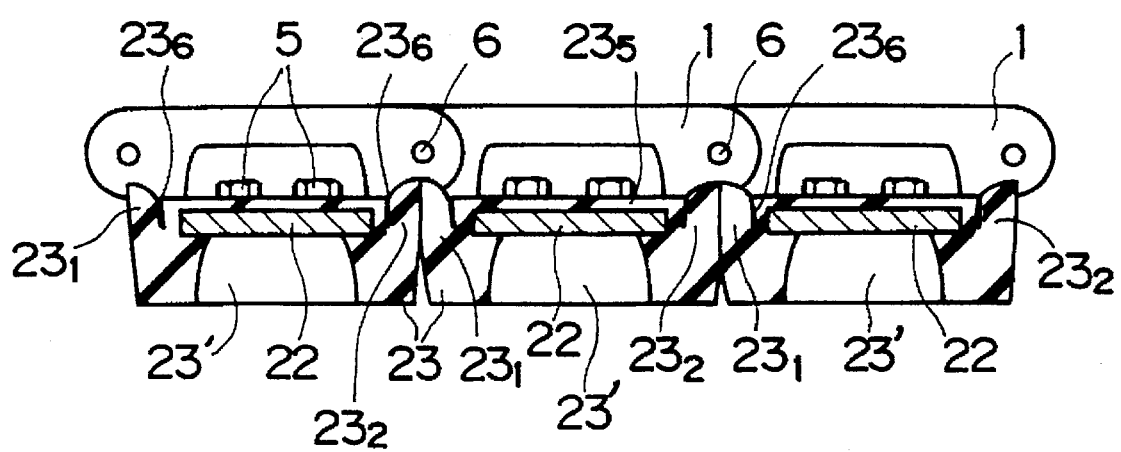
FIG. 29 is a side view of a crawler using the crawler block illustrated in FIG. 28.

FIG. 28 is a side view of the crawler block 22 formed particularly favorably in the present embodiment, and FIG. 29 is a side view of a crawler using this crawler block 22.

As illustrated in the figures, it is preferable that grooves $23_6$ be formed in the rubber materials $23_1$, $23_2$ along the longitudinal direction of the crawler block 22. By forming the grooves $23_6$, the rubber materials $23_1$, $23_2$ formed at the end portions of the crawler block 22 can be easily bent by the contacting pressure when the rubber materials $23_1$, $23_2$ contact each other. As a result, even if the space F between the rubber materials $23_1$, $23_2$ is zero or less, i.e., the rubber materials $23_1$, $23_2$ always contact each other, there is no particular hindrance. Namely, due to the grooves $23_6$, the rubber materials $23_1$, $23_2$ bend easily so as to protrude toward the link 1 side, and the rubber materials $23_1$, $23_2$ being easily abraded when they protrude in the opposite direction and contact the ground can be prevented. Cases in which the groove $23_6$ is formed in only one of the rubber materials $23_1$, $23_2$ can be contemplated.

A twelfth embodiment of the present invention will be described hereinafter.

Figure 30:
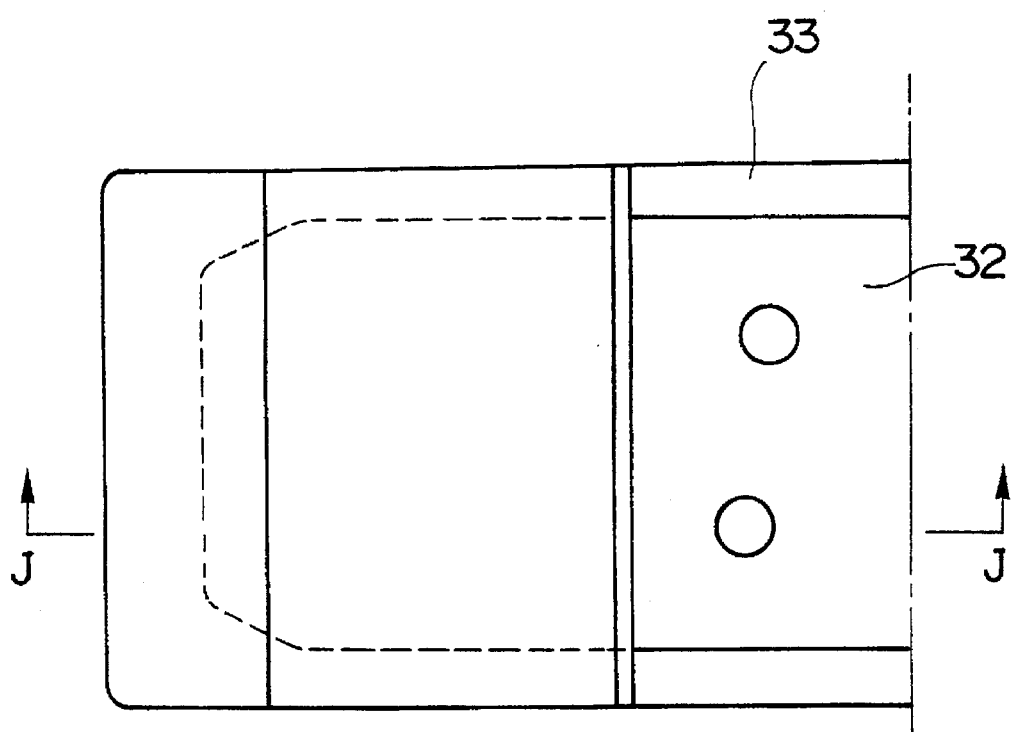
FIG. 30 is a plan view of a portion of an inner peripheral side of a crawler block rubber pad of a twelfth embodiment of the present invention.
Figure 31:
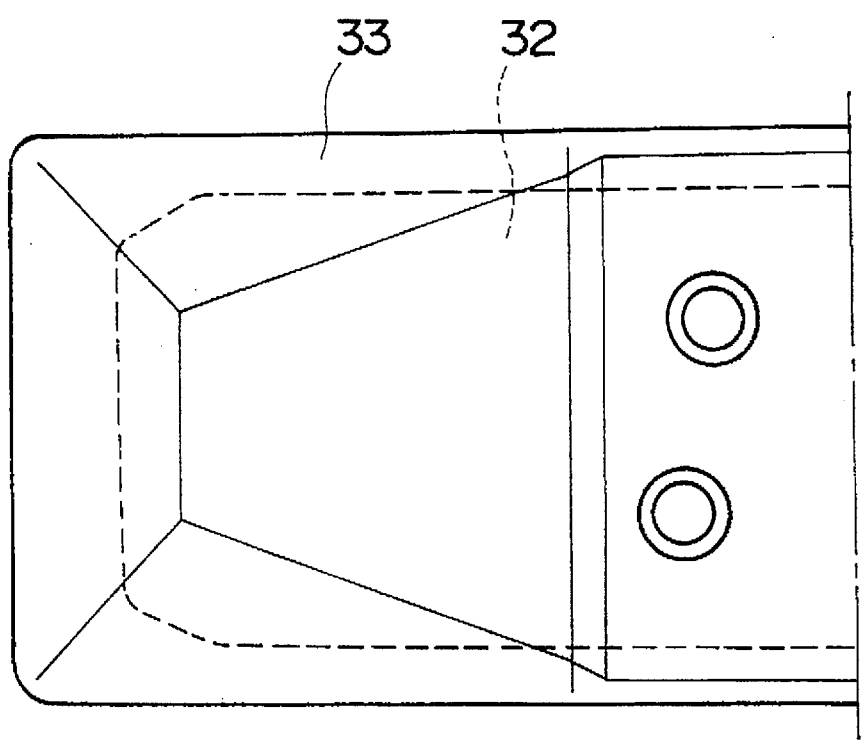
FIG. 31 is a plan view of a portion of an outer peripheral side of the crawler block rubber pad of the twelfth embodiment.
Figure 32:
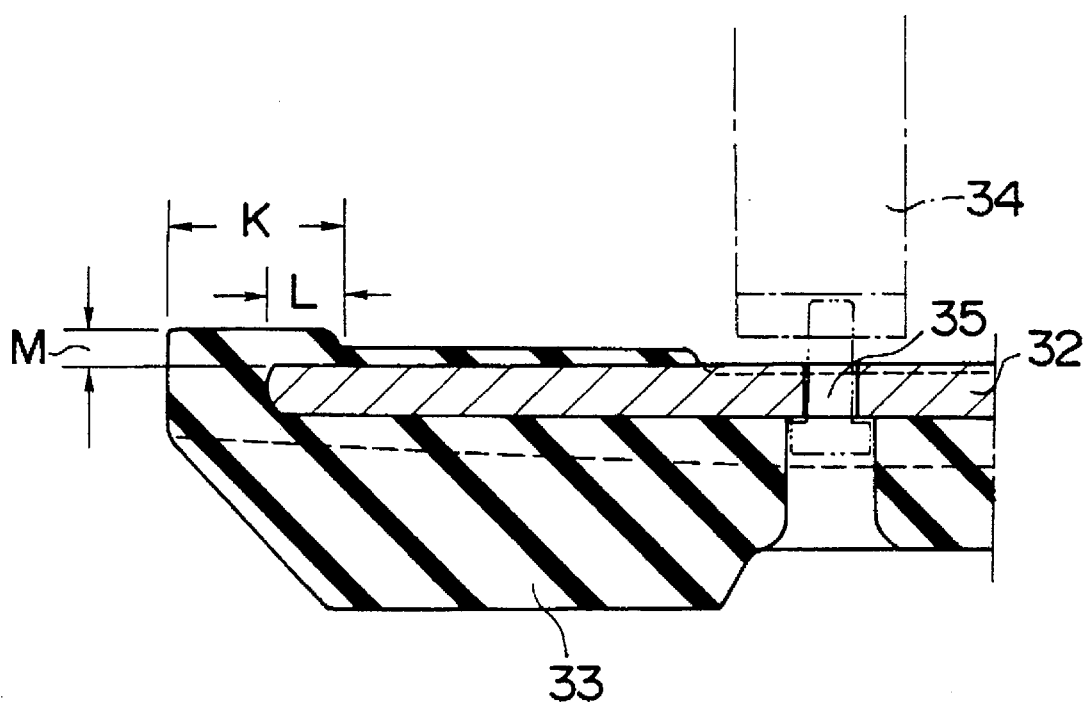
FIG. 32 is a cross sectional view taken along line J—J of FIG. 30.

FIG. 30 is a plan view of an inner peripheral side portion of the crawler block rubber pad of the twelfth embodiment of the present invention. FIG. 31 is a plan view of an outer peripheral side portion, and FIG. 32 is a cross sectional view taken along line J—J of FIG. 30.

In the figures, reference numeral 32 is a flat crawler block, 33 is a rubber pad, and 34 is a crawler link. As shown in the figures, the rubber pad 33 is formed at the inner surface periphery of the crawler block 32 in order to adhere the rubber pad 33 and the crawler block 32 together well and extend the life span of the crawler block rubber pad.

If the rubber pads 33 protrude to the region where the crawler links 34 are connected to the crawler block 32, the attachment is unstable. Therefore, in the present embodiment, at the regions where the crawler links 34 are connected, the rubber pad 33 does not protrude at the inner peripheral side of the crawler block 32.

Figure 33:
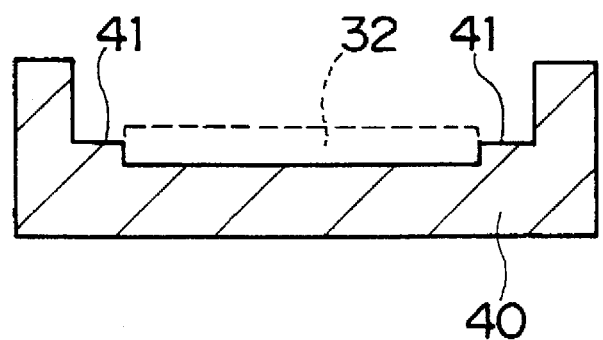
FIG. 33 is a cross sectional view of a mold for forming the crawler block rubber pad.

In order to obtain this type of crawler block rubber pad, for example, as illustrated in FIG. 33, protrusions 41 are formed at the interior surface of a mold 40 for forming the crawler block rubber pad, so as to contact a region at which the crawler block 32 is set.

In the present invention, because the reverse surface of the crawler block 32 is flat, bolt attachment holes 35 can be opened from either side, and the holes can be made to have a larger diameter at the crawler link side so that the fastening force can be improved. In the conventional crawler block with a grouser, the bolt attachment holes can only be formed from the grouser side. Therefore, the holes are tapered so as to become wide at the grouser side, and the fastening force is small.

Further, because there are no grousers or the like at the ground-contacting surface, the thickness of the rubber pad can be made even larger. As a result, no local strain is applied to the rubber, and the durability of the rubber is improved.

The rubber around the inner side of the crawler block 32 can be expected to improve durability as described above. It is preferable that the thickness M thereof is 4 mm or more. Alternatively, given that the width of the rubber at the transverse direction outer side of the crawler block 32 is K and that the width of the rubber positioned at the inner side is L, it is desirable that L is greater than or equal to 0.5K. This type of rubber at the inner side is also useful in preventing rusting of the crawler block 32.

As illustrated in the figures, the four corners of the crawler block 32 are eliminated obliquely. This is to suppress wearing of the end portions of the pad rubber. However, the four corners may be eliminated such that the remaining surfaces are arc-shaped. Chamfering in the direction of thickness of the crawler block 32 or processing in cross sectional arc shapes are good means for achieving this object.

What is claimed is:

1. A crawler comprising:

at least one connecting member;

at least one link connectable to other links by said at least one connecting member to form an endless shape such that said at least one link can be assembled onto a drive mechanism of a machine having a predetermined machine body weight, said at least one link having an inner link surface facing the drive mechanism of the machine when assembled thereon, and an outer link surface facing away from the drive mechanism when assembled thereon;

at least one crawler block having an inner crawler surface with a portion attached to the outer link surface, and an outer crawler surface facing away from the outer link surface; and at least one pad having an inner pad surface vulcanized and adhered to said outer crawler surface and to a portion of the inner crawler surface not attached to the outer link surface, and an outer pad surface facing away from the at least one crawler block, the outer pad surface having a peripheral portion and a central portion, the at least one pad having a peripheral thickness defined by a distance between a peripheral portion of the outer pad surface that faces away from the outer side of the at least one crawler block and a peripheral portion of the outer pad surface that faces away from the inner side of the at least one crawler block, and a central thickness defined by a distance between said outer pad surface and said inner pad surface at said central portion, the peripheral thickness being greater than the central thickness, wherein the peripheral thickness is proportionally related to the machine body weight in accordance with a mathematical function.

2. A crawler according to claim 1, wherein a durability of the at least one pad is substantially proportional to the peripheral thickness of said at least one pad.

3. A crawler according to claim 1, wherein the peripheral thickness is substantially proportional to the square root of said machine body weight.

4. A crawler according to claim 1, wherein the peripheral thickness is about 1 to 10 mm larger than the central thickness.

5. A crawler according to claim 1, wherein the central thickness is at least 20 mm.

6. A crawler according to claim 3, wherein the peripheral thickness satisfies the relation:

$$PT \geq l_0 \times (W)^{0.5} \text{ mm},$$

where PT is the peripheral thickness and W is said predetermined weight of said machine.

7. A crawler according to claim 3, wherein the peripheral thickness is at least 20 mm and satisfies the relation:

$$PT \geq l_0 \times (W)^{0.5} \text{ mm},$$

where PT is the peripheral thickness and W is said predetermined weight of said machine.

8. A crawler according to claim 1, wherein the outer crawler surface is substantially planar.

9. A crawler according to claim 1, wherein the peripheral thickness and central thickness are selected so as to allow the outer pad surface to become substantially planar when the weight of the machine is supported by said outer pad surface.

10. A crawler according to claim 1, wherein said at least one pad is a rubber pad.

11. A crawler comprising:

at least one connecting member;

at least one link connectable to other links by said at least one connecting member to form an endless shape such that said at least one link can be assembled onto a drive mechanism of a machine having a predetermined weight, said at least one link having an inner link surface facing the drive mechanism of the machine when assembled thereon, and an outer link surface facing away from the drive mechanism when assembled thereon;

at least one crawler block having an inner crawler surface with a portion attached to the outer link surface, and an outer crawler surface facing away from the outer link surface;

at least one pad having an inner pad surface vulcanized and adhered to said outer crawler surface and to a portion of the inner crawler surface not attached to the outer link surface, and an outer pad surface facing away from the at least one crawler block, the outer pad surface having a peripheral portion and a central portion, the at least one pad having a peripheral thickness defined by a distance between a peripheral portion of the outer pad surface that faces away from the outer side of the at least one crawler block and a peripheral portion of the outer pad surface that faces away from the inner side of the at least one crawler block, and a central thickness defined by a distance between said outer pad surface and said inner pad surface at said central portion, the peripheral thickness being greater than the central thickness, said at least one pad, as viewed from a direction orthogonal to the outer pad surface, having a portion that extends away from an outer periphery of said at least one crawler block at a distance such that when said at least one crawler block is arranged in said endless shape, a gap distance between said at least one crawler block and an adjacent crawler block is "substantially" filled by adjacent pad portions that extend away from the outer periphery of said at least one crawler block and said adjacent crawler block.

12. A crawler comprising:

at least one connecting member;

at least one link connectable to other links by said at least one connecting member to form an endless shape such that said at least one link can be assembled onto a drive mechanism of a machine having a predetermined machine body weight, said at least one link having an inner link surface facing the drive mechanism of the machine when assembled thereon, and an outer link surface facing away from the drive mechanism when assembled thereon;

at least one crawler block having an inner crawler surface with a portion attached to the outer link surface, and an outer crawler surface facing away from the outer link surface; and at least one pad having an inner pad surface vulcanized and adhered to said outer crawler surface and to a portion of the inner crawler surface not attached to the outer link surface, and an outer pad surface facing away from the at least one crawler block, the outer pad surface having a peripheral portion and a central portion, the at least one pad having a peripheral thickness defined by a distance between a peripheral portion of the outer pad surface that faces away from the outer side of the at least one crawler block and a peripheral portion of the outer pad surface that faces away from the inner side of the at least one crawler block, and a central thickness defined by a distance between said outer pad surface and said inner pad surface at said central portion, the peripheral thickness being greater than the central thickness, wherein the peripheral thickness and central thickness are selected such that when the at least one pad is subjected to the machine body weight, the peripheral portion of the outer pad surface that faces away from the inner side of the at least one crawler block is co-planar with the central portion of the outer pad surface.

* * * * *